(12) United States Patent  
Keller

(10) Patent No.: US 6,974,098 B2
(45) Date of Patent: Dec. 13, 2005

(54) CULINARY PRESS WITH SCRAPER

(75) Inventor: Rudy Keller, Greenbrae, CA (US)

(73) Assignee: Maxpat Trading & Marketing (Far East) Ltd., Tsimshatsui (HK)

( * ) Notice: Subject to any disclaimer, the term of this patent is extended or adjusted under 35 U.S.C. 154(b) by 0 days.

(21) Appl. No.: 10/339,117

(22) Filed: Jan. 9, 2003

(65) Prior Publication Data

US 2004/0061010 A1    Apr. 1, 2004

(30) Foreign Application Priority Data

Oct. 1, 2002    (GB)    .................................... 0200512

(51) Int. Cl.⁷ .............................................. B30B 9/06
(52) U.S. Cl. ...................... 241/169; 100/112; 100/116; 100/234; 241/84.3; 241/95; 241/166; 241/168
(58) Field of Search ........................... 241/83, 84.3, 95, 241/166; 100/112, 234, 243

(56) References Cited

U.S. PATENT DOCUMENTS

| | | | |
|---|---|---|---|
| 5,165,335 A | | 11/1992 | Bianchi |
| 5,167,335 A | * | 12/1992 | McBride et al. ............ 215/252 |
| 5,562,256 A | | 10/1996 | Wolman et al. |
| 6,244,529 B1 | | 6/2001 | Tardif et al. |

* cited by examiner

*Primary Examiner*—Derris H. Banks
*Assistant Examiner*—Jason Y. Pahng
(74) *Attorney, Agent, or Firm*—Wood, Herron & Evans, LLP

(57) ABSTRACT

A culinary press (2) has a pair of pivotably connected members (4, 6) one comprising a chamber for receiving a foodstuff and having a perforated surface (18), and the other a plunger (24) movable into the chamber for, in use, forcing food through the perforated surface (18) to an opposite side thereof, and a scraper (26) mounted on the press (2) so as to be movable across the said opposite side of the perforated surface (18) to scrape off any foodstuff adhered thereto after crushing of food.

18 Claims, 3 Drawing Sheets

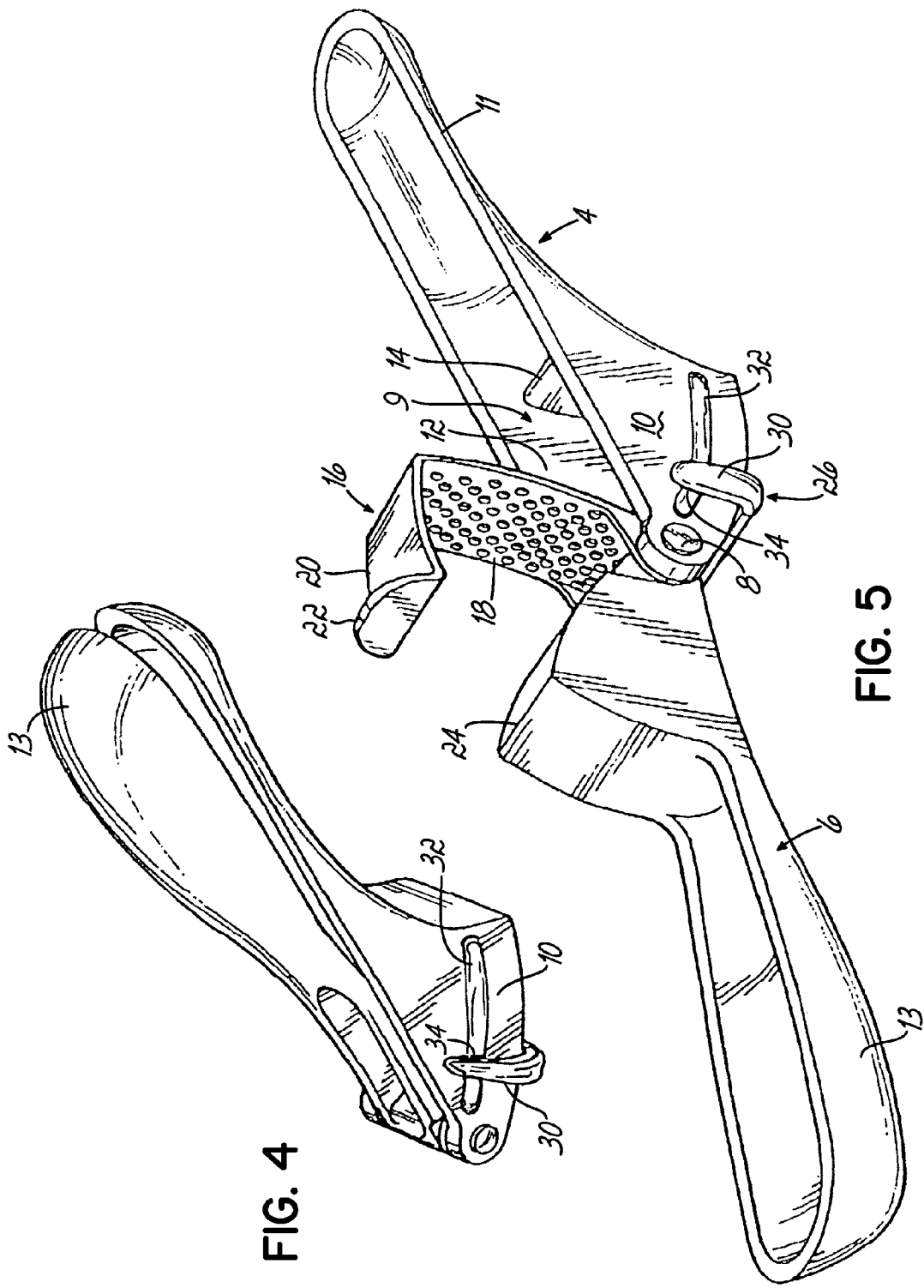

CULINARY PRESS WITH SCRAPER

BACKGROUND OF THE INVENTION

The present invention relates to a culinary press and particularly, although not exclusively, to a press used for crushing garlic.

Garlic presses are well-known and can take a variety of forms. In one popular form the press comprises two pivotably connected members having handles extending therefrom one of which defines at one end a chamber into which a garlic clove is placed, and the other of which is provided with a plunger portion which extends into the chamber when the handles are brought together, thereby crushing the garlic clove and forcing the clove through a perforated surface at a bottom of the chamber.

Although such presses are well designed to effectively crush the garlic, one difficulty is that there is a tendency for the garlic which has been crushed through the perforated surface to adhere to the underside of the perforated surface. The present invention seeks to provide a structure which overcomes this problem.

SUMMARY OF THE INVENTION

According to the present invention there is provided a culinary press comprising a first member defining at least in part a food-receiving chamber; a perforated surface defining a base of the chamber; a second member pivotably connected to the first member and including a plunger movable into the chamber for, in use, forcing food through the perforated surface to an opposite face thereof; and a scraper blade which extends across the perforated surface and is mounted through guide means so as to be movable over said opposite face.

This structure readily facilitates the removal of any garlic or other foodstuffs which may have adhered to the underside of the perforated plate, reducing wastage and making for easier cleaning.

In one embodiment the first member includes a pair of opposed sidewalls with said chamber defined therebetween, wherein the scraper blade is secured at opposite ends by means of guide fingers which fit into guide tracks or slots formed in the outer surfaces of the sidewalls to extend parallel to the perforated surface. Alternatively, the scraper blade may be constrained at opposite ends by means of a pair of guide rails at opposite sides of the perforated surface which define a pair of slots extending parallel to the perforated surface. The opposite ends of the scraper blade extend through said slots, each end having an enlarged head portion on the opposite outer ends to hold the scraper blade within the rails. The perforated surface is preferably of elongate arcuate form curved along its length, the guide tracks or slots following the curve of the perforated surface.

The perforated surface may be defined in a separate plate pivotably connected between the first member and plunger and pivotable out of the first member. This press structure is found to be particularly effective in crushing garlic or other foodstuffs as well as being very easy to clean after use.

In a further aspect there is provided a culinary press comprising a first member having a pair of opposed sidewalls with a handle extending therefrom and an elongate perforated plate extending between the walls, defining a food-receiving chamber therebetween with the plate forming a base of the chamber; a second member pivotably connected to the first member and including a plunger which is receivable within the chamber and movable to towards the perforated plate to force food through the plate to the opposite face thereof; and a scraper blade extending across laterally across a width of the perforated surface mounted through guide means on the sidewalls to be movable over said opposite face thereof.

BRIEF DESCRIPTION OF THE DRAWINGS

Embodiments of the invention will now be described, by way of example only, with reference to the following drawings in which:

FIG. 4 is a perspective view of the press;

FIG. 5 shows the press in an opened out condition;

DISCUSSION OF THE PREFERRED EMBODIMENTS

Figure 1:
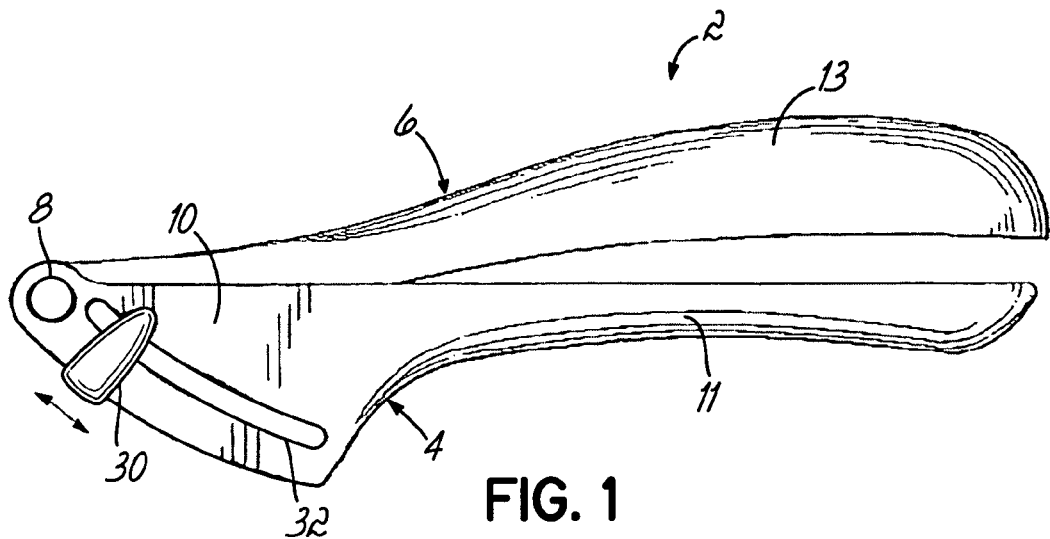
FIG. 1 is a side view of a culinary press in accordance with a first embodiment of the invention.
Figure 2:
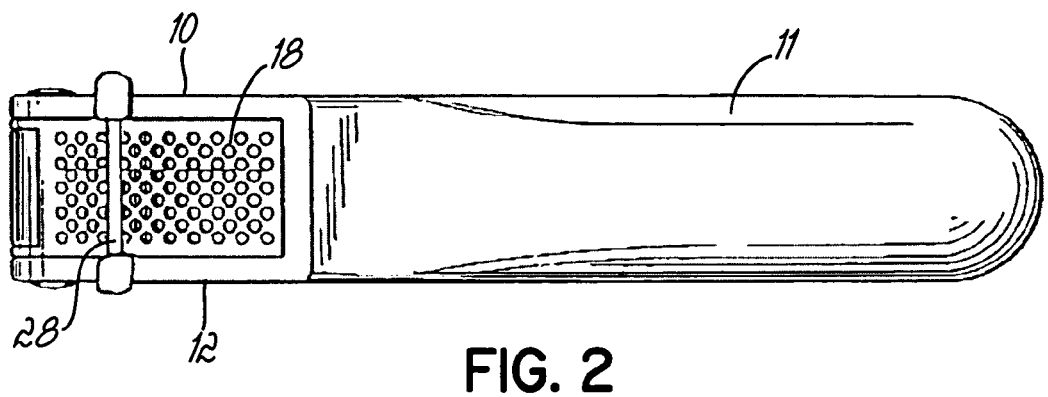
FIG. 2 is a view of the underside of the press.
Figure 3:
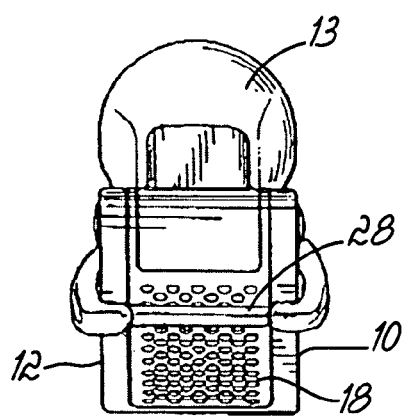
FIG. 3 is a front view of the press.

With reference to the drawings, the culinary press in accordance with the first embodiment of the invention is generally designated 2 and comprises first and second members 4, 6 pivotably connected together by means of a pin 8 which extends through the aligned apertures at ends of respective members 4, 6. The first member 4 has a body which defines in part a food-receiving chamber 9 between opposed sidewall regions 10, 12 and a backwall region 14, as best seen in FIG. 5, and includes a first handle 11 extending therefrom.

The second member 6 defines, at the end thereof to which it is pivotably connected to the first member 4, a plunger 24 dimensioned to be received in the aforesaid chamber 9. A handle portion 13 extends rearwardly from the plunger 24.

Pivotably mounted between the first and second members 4, 6 there is provided a perforated plate 16 having an arcuate perforated surface 18 of length greater than its width, joined to an upstanding end region 20 and a bent over lip 22 as best seen in FIG. 5. The sidewalls 10, 12 of the first member 4 and the perforated surface 18 and the plate end wall 20 together define the chamber into which garlic or other foodstuff to be crushed is placed.

A scraper 26 is provided on the first member 6 as now described. The scraper 26 comprises a generally U-shaped element having a central scraper blade 28 which lies closely beneath the underside of the plate 18 (when the plate is in its operative position at the bottom of the chamber) and at opposite ends thereof, upstanding end pieces 30. The outer surfaces of the sidewalls 10, 12 are formed with grooves or guide tracks 32 having the same curved profile as the lower edge of the sidewalls 10, 12 and perforated plate 16. The end pieces 30 are provided with inwardly-directed protruding guide fingers 34 which sit in the grooves 32 thereby holding the scraper 26 on the member 4 whilst allowing the scraper 26 to be moved backwards and forwards across the underside of the perforated surface 18, as indicated by the arrow in FIG. 1.

In use, the members 4 and 6 are pivoted into the open position illustrated in FIG. 5, the perforated plate 16 is pushed down between the sidewall 10, 12 to the bottom of the chamber and an item of foodstuff to be crushed placed on the upper side of the perforated surface 18. The handles 11, 13 are then pivoted together so that the plunger 24 extends into the chamber crushing the foodstuff through the perforated surface 18 from where it emerges on the opposite underside face thereof. A sweep of the scraper 26 along its groove 32 serves to release any foodstuff remaining adhered to the underside of the perforated surface 18.

In use, the members 4 and 6 are pivoted into the open position illustrated in FIG. 5, the perforated plate 16 is pushed down between the sidewall 10, 12 to the bottom of the chamber and an item of foodstuff to be crushed placed on the upper side of the perforated surface 18. The handles 11, 13 are then pivoted together so that the plunger 24 extends into the chamber crushing the foodstuff through the perforated surface 18 from where it emerges on the underside thereof. A sweep of the scraper 26 along its guide track 32 serves to release any foodstuff remaining adhered to the underside of the perforated surface 18.

The scraper blade 28 may be formed of metal or rigid plastics material and may if desired be formed with an upwardly-directed sharp edge to further facilitate removal of foodstuff adhering to the underside of the perforated surface 18. It may also be arranged that the scraper 26 has a small degree of flexibility whereby the end pieces 30 can be bent apart sufficiently to allow the fingers 34 to be released from the grooves 32 and the entire scraper 26 thereby removed from the remainder of the press to facilitate cleaning.

Figure 6:
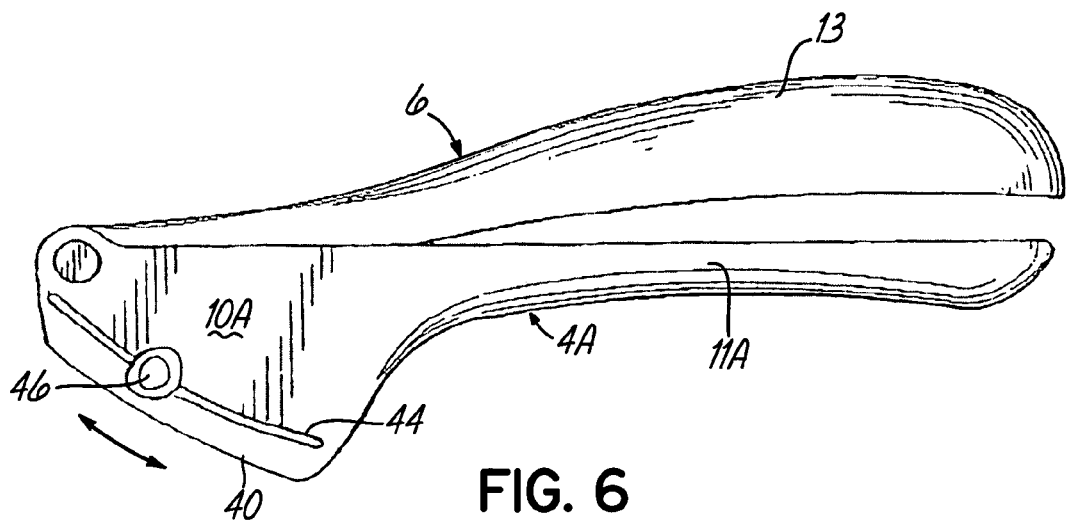
FIG. 6 is a side view of a second embodiment of the invention.
Figure 7:
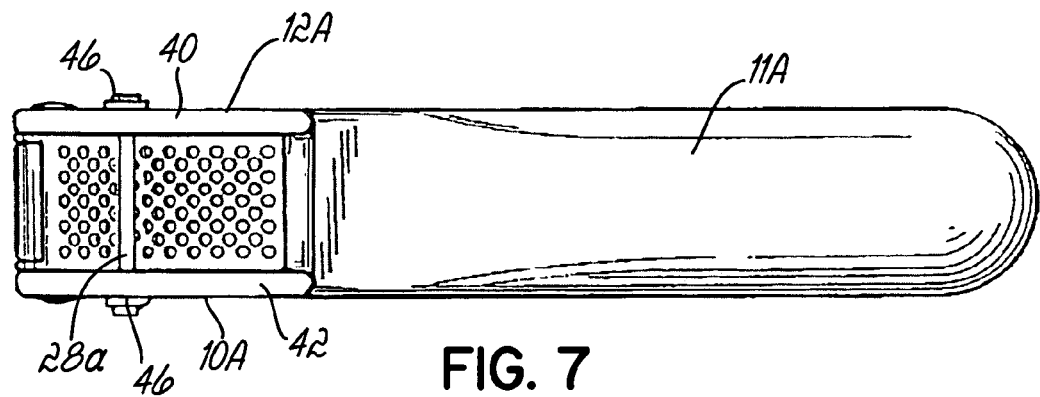
FIG. 7 is a view of the underside of the press of FIG. 6.
Figure 8:
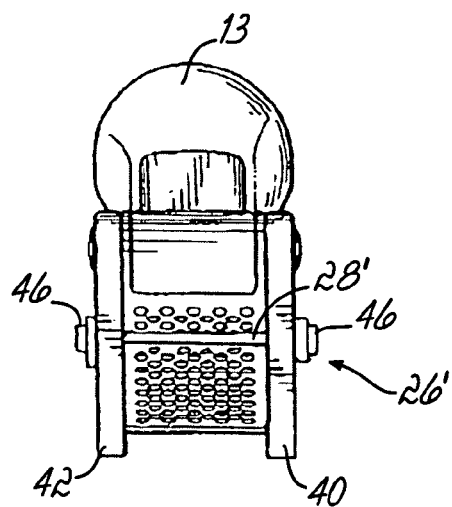
FIG. 8 is a front view of the press of FIG. 6.

In an alternative embodiment illustrated in FIGS. 6 to 8, which is identical to the first embodiment except as now discussed, the lower region of sidewalls 10A, 12A on the member 4A are provided with rails 40, 42 respectively which define above them slots 44. Opposite ends of the scraper blade 28A extend through the slots 44 so that the scraper 26A is constrained to move along the slots 44. The scraper blade 28A is here provided with enlarged head portions 46 holding it within the slots.

Although the invention is illustrated with regard to culinary presses or the type having pivotably connected opposed handle members one of which including a plunger portion receivable into a chamber, the provision of a scraper is applicable to other forms of culinary press where a plunger is received within a chamber forcing foodstuff through a perforated plate, with the scraper mounted for movement over an underside of the press.

What is claimed is:

1. A culinary press comprising:
   a first member defining at least in part a food-receiving chamber;
   a perforated surface defining a base of the chamber;
   a second member pivotably connected to the first member and including a plunger movable into the chamber for, in use, forcing food through the perforated surface to an opposite face thereof;
   a scraper blade extending across said opposite face of the perforated surface; and
   a fastener mounting the scraper blade to the first member, the fastener limiting movement of the scraper blade to a defined path relative to said opposite face.

2. The culinary press of claim 1 wherein the defined path is parallel to the opposite face.

3. The culinary press of claim 1 wherein the defined path is arcuate.

4. The culinary press of claim 1 wherein the scraper blade is mechanically interconnected with the first member by the fastener.

5. A culinary press comprising:
   a first member defining at least in part a food-receiving chamber;
   a perforated surface defining a base of the chamber;
   a second member pivotably connected to the first member and including a plunger movable into the chamber for, in use, forcing food through the perforated surface to an opposite face thereof;
   and a scraper blade which extends across the perforated surface and is mounted on the first member by guide means so as to be movable over said opposite face;
   wherein the first member includes a pair of opposed sidewalls with said chamber defined there between, wherein the scraper blade is secured at opposite ends by means of guide fingers which fit into guide tracks or slots formed in outer surfaces of the sidewalls to extend parallel to the perforated surface.

6. A culinary press according to claim 5 wherein the perforated surface is of elongate arcuate form curved along its length, said slots or tracks following the curve of said perforated surface.

7. A culinary press according to claim 5 wherein a first handle member extends from said first member, and a second handle member extends from the plunger of the second member.

8. A culinary press comprising:
   a first member defining at least in part a food-receiving chamber;
   a perforated surface defining a base of the chamber;
   a second member pivotably connected to the first member and including a plunger movable into the chamber for, in use, forcing food through the perforated surface to an opposite face thereof;
   and a scraper blade which extends across the perforated surface and is mounted on the first member by guide means so as to be movable over said opposite face;
   wherein the scraper blade is constrained at opposite ends by means of a pair of guide rails at adjacent opposite sides of the perforated surface which define a pair of slots extending parallel to the perforated surface.

9. A culinary press according to claim 8 wherein opposite ends of the scraper blade extend through said slots, each end having an enlarged head portion on the opposite outermost ends to hold the scraper blade within the rails.

10. A culinary press according to claim 9 wherein the perforated surface is of elongate arcuate form curved along its length, said slots following the curve of said perforated surface.

11. A culinary press according to claim 9 wherein the perforated surface is defined in a separate plate pivotably connected between the first and second members.

12. A culinary press comprising:
    a first member having a pair of opposed sidewalls with a handle extending therefrom and an elongate perforated plate extending from one side wall to the other defining a food-receiving chamber there between with the plate forming a base of the chamber;
    a second member pivotably connected to the first member and including a plunger which is receivable within the chamber and movable towards the perforated plate to force food through the plate to the opposite face thereof;
    and a scraper blade extending laterally across a width of the perforated surface mounted by guide means on the sidewalls to be movable over said opposite face thereof.

13. A culinary press comprising:
a first member defining at least in part a food-receiving chamber;
a perforated surface defining a base of the chamber;
a second member pivotably connected to the first member and including a plunger movable into the chamber for, in use, forcing food through the perforated surface to an opposite face thereof;
a scraper blade which extends across said opposite face of the perforated surface; and
guide means for mounting the scraper blade to the first member for movement of the scraper blade over said opposite face.

14. The culinary press of claim 13 wherein the guide means further comprise slots in the first member.

15. The culinary press of claim 13 wherein the guide means further comprises grooves in the first member.

16. The culinary press of claim 13 wherein the first and second members remain pivotably connected while the scraper blade extends across the perforated surface.

17. The culinary press of claim 13 wherein the first and second members remain pivotably connected while the scraper blade is mounted in the guide means.

18. A culinary press according to claim 13 wherein the first member includes a pair of opposed sidewalls with said chamber defined there between, and wherein the guide means comprises guide tracks or slots formed in outer surfaces of the sidewalls extending parallel to the perforated surface, which constrain guide fingers provided at opposite ends of the scraper blade.

* * * * *

UNITED STATES PATENT AND TRADEMARK OFFICE
CERTIFICATE OF CORRECTION

PATENT NO. : 6,974,098 B2  
DATED : December 13, 2005  
INVENTOR(S) : Rudy Keller Page 1 of 1

It is certified that error appears in the above-identified patent and that said Letters Patent is hereby corrected as shown below:

<u>Column 2, line 64 through Column 3, line 7,</u>
Should be deleted.

<u>Column 3,</u>
Lines 15-16, "on the underside thereof" should read -- on the opposite underside face thereof --.
Lines 16-17, "its guide track 32" should read -- its groove 32 --.

Signed and Sealed this

Twenty-first Day of March, 2006

JON W. DUDAS
*Director of the United States Patent and Trademark Office*